United States Patent
Broman et al.

(10) Patent No.: US 6,905,797 B2
(45) Date of Patent: Jun. 14, 2005

(54) POROUS MAT ELECTRODES FOR ELECTROCHEMICAL REACTOR HAVING ELECTROLYTE SOLUTION DISTRIBUTION CHANNELS

(75) Inventors: Barry M. Broman, Kirkland, WA (US); Andrea Zocchi, Florence (IT)

(73) Assignee: Squirrel Holdings Ltd., Grand Cayman (CM)

( * ) Notice: Subject to any disclaimer, the term of this patent is extended or adjusted under 35 U.S.C. 154(b) by 371 days.

(21) Appl. No.: 10/309,222

(22) Filed: Dec. 4, 2002

(65) Prior Publication Data

US 2003/0087156 A1 May 8, 2003

Related U.S. Application Data

(63) Continuation-in-part of application No. 09/529,726, filed on Apr. 12, 2001, now Pat. No. 6,555,267.

(51) Int. Cl.[7] .............................. H01M 4/80; H01M 4/66
(52) U.S. Cl. .................... 429/235; 429/236; 429/105; 429/209; 429/245; 429/149; 29/623.1
(58) Field of Search ................................. 429/105, 235, 429/236, 209, 245, 149; 29/623.1

(56) References Cited

U.S. PATENT DOCUMENTS

| | | | |
|---|---|---|---|
| 4,751,153 A | 6/1988 | Roth | 429/35 |
| 4,886,586 A | 12/1989 | Morris | 204/128 |
| 2004/0202915 A1 * | 10/2004 | Nakaishi et al. | 429/34 |

FOREIGN PATENT DOCUMENTS

| | | |
|---|---|---|
| EP | 0 814 527 A2 | 12/1997 |
| GB | 2 163 595 A | 2/1986 |

* cited by examiner

Primary Examiner—John S. Maples
(74) Attorney, Agent, or Firm—Connolly Bove Lodge & Hutz LLP; Larry J. Hume (57) ABSTRACT

A multicell assembly for a redox flow electrolyzer is constituted by alternately stacking pre-assembled elements, typically an electrode subassembly including porous mat electrodes on opposite faces of a conductive plate and a permionic membrane subassembly. Pressure drops in circulating the electrolyte solutions through respective cell compartments, in contact with fluid permeable three-dimensional electrodes in the form of porous mats, are reduced while enhancing evenness of electrolyte refreshing over the whole geometrical cell-area, by defining cooperatively interleaved flow channels in the porous mat electrode. Two interleaved orders of parallel flow channels are defined. All the parallel spaced channels of each order extend from a common orthogonal base channel formed along the respective inlet or outlet side of the electrolyte flow chamber, and terminate short of reaching the base channel of the other. The flow channels include comb-shaped flow distributing channelworks having parallel fingers which interleave with each other.

16 Claims, 5 Drawing Sheets

POROUS MAT ELECTRODES FOR ELECTROCHEMICAL REACTOR HAVING ELECTROLYTE SOLUTION DISTRIBUTION CHANNELS

CROSS-REFERENCE TO RELATED APPLICATIONS

This application is a continuation-in-part (CIP) application of allowed U.S. patent application Ser. No. 09/529,726, now U.S. Pat. No. 6,555,267 by Barry M. Broman and Andrea Zocchi, filed on Apr. 12, 2001 for "Membrane-Separated, Bipolar Multicell Electrochemical Reactor", the entire contents of which are hereby incorporated by reference, and for which priority is claimed under 35 U.S.C. §120.

BACKGROUND OF THE INVENTION

This invention relates to electrochemical reactors for conducting reduction and oxidation reactions in respective positive and negative electrolyte solutions, without gas evolution at the electrodes. More specifically the invention relates to a membrane-separated, multicell electrochemical reactor for implementing a redox flow battery system.

Redox (reduction/oxidation) flow battery systems are increasingly attracting interest as efficient energy conversion systems. Among redox couple candidates, the all vanadium redox system is often preferred.

Structurally, electrochemical reactors that have been proposed for redox flow battery systems have been derived from the electrochemical reactor structures developed for general electrolysis processes, the only adaptation having concerned the materials employed as electrodes.

Generally, electrochemical reactors used as redox batteries are composed of a stack of electrode elements separated by ion exchange membranes, defining a positive electrolytic solution ("positive electrolyte") flow chamber on one side of each membrane, and a negative electrolytic solution ("negative electrolyte") flow chamber on the opposite side thereof. The stack of component elements is assembled together in a filter-pass arrangement between two end electrode elements.

U.S. Pat. No. 4,886,586 discloses a frame assembly for ion exchange membrane consisting of two frames holding the membrane therebetween. The assembly is realizably fastened by means of separate screws screwed through a counterflange, the membrane and the inner flange of the frame.

Commonly, the elements have a frame provided with coordinated through holes forming inlet and outlet manifolds for the two electrolytes that are circulated in a parallel mode through the positive electrolyte flow chambers and the negative electrolyte flow chambers, respectively. Traditionally the elements are mounted and operated in a vertical position.

A redox system requires nonnegligible electrolyte flow rates through the flow chambers of the reactor in order to maintain optimal half-cell reactions conditions at the electrodes.

A membrane-separated multicell electrochemical reactor for half-cell reduction and oxidation reactions in respective positive and negative electrolytes, without gas evolution, may even have an architecture that makes it easier to assemble by allowing stacking fully pre-assembled elements horizontally, one on top of the other, and which is suitable for operation in the same horizontal orientation of the bipolar elements.

The multicell assembly may be constituted by alternately stacking two types of pre-assembled elements, one may be a bipolar electrode subassembly and the other a membrane subassembly.

The alternate stack of elements may be piled over a bottom end electrode element, and the stack may be terminated by placing, over the last membrane element, a top end electrode element. The two end elements eventually compress the stack upon tightening a plurality of tie rods, commonly arranged around the perimeter of the stacked elements, according to the common practice of tightening a filter-press stack in a hydraulically sealed manner, by virtue of gaskets operatively installed between the coupling faces of the frames of the stacked elements.

Each electrode element and each ion exchange membrane separator element may include a substantially similar rectangular frame piece, usually made of an electrically nonconductive and chemically resistant material, typically of molded plastic material, having through holes and recesses in coordinated locations disposed along two opposite sides of the rectangular frame forming, upon completion of the assembling, ducts for the separate circulation of the negative electrolyte and of the positive electrolyte through all the negative electrolyte flow chambers and all positive electrolyte flow chambers, respectively.

According to a cascade flow mode, the negative electrolyte enters along a first side of a negative electrolyte flow chamber, flows through the chamber toward the opposite or second side thereof, exits the chamber, flows through the coordinated holes through the frame holding the electrode and through the frame holding the next membrane separator, reaching the level of the next negative electrolyte flow chamber and enters it from the same second side through which it exited from the previous negative electrolyte flow chamber and exits this next negative electrolyte flow chamber from the same first side it entered the previous negative electrolyte flow chamber, to flow through coordinated holes through the next pair of frames to the level of the next negative electrolyte flow chamber and so forth.

The same flow path is arranged also for the positive electrolyte, either in a "countercurrent" or in an "equicurrent" mode through the battery.

According to such an architecture, the electrochemical reactor does not have inlet and outlet manifolds for the two electrolytes. On the contrary, the electrolytes flow through the respective flow chambers in a zigzag path, that is essentially in hydraulic series or cascade mode instead of in hydraulic parallel mode.

In this way, by-pass current may only be "driven" by a voltage difference of about one-cell voltage, and becomes practically negligible and, above all, it does not cause any corrosion on conductive parts.

Irrespective of the particular stack architecture, and most preferably, each electrode consists of a porous fabric or mat, commonly of carbon fibers, in electrical continuity with a similar electrode structure on the opposite face of a conductive current collecting plate for providing substantially three-dimensional electrode structures having a large active area, that in many cases may occupy almost entirely the relative electrolyte flow chamber.

This arrangement, dictated by the need to enhance the rate of the half-cell reaction that can be supported at the electrode, contrasts with the need of minimizing the power absorbed by the motors that drive the electrolytes pumps in order to flow the solutions through the plurality of respective flow chambers at an adequate flow rate.

As may be readily recognized, this problem is aggravated when passing from a traditional parallel flow of the electrolyte through all the respective flow chambers from a common inlet manifold to common outlet manifold, to a cascade flow from one chamber to the next, starting from one end to the opposite end of the multicell stack.

Although the cascade flow mode is extremely effective in eliminating any corrosion problems due to by-pass currents, it necessarily implies an augmented pressure drop in flowing the two electrolytes through the battery.

SUMMARY OF THE INVENTION

According to one aspect of the invention, useful in case of use of porous three-dimensional electrodes extending from an electrically conductive current collector towards the permionic membrane separator of the cell, the pressure drop of the flowing electrolytes through the respective pluralities of flow chambers either partly or completely occupied by the porous electrode mass may be significantly reduced while narrowing or even eliminating any residual gap or unobstructed flow space between the porous electrode and the permionic membrane separator, which may even contact each other to minimize ohmic losses in the liquid body of electrolytic solution (electrolyte).

These apparently contradictory conditions are indeed accomplished according to an embodiment of the invention by defining (cutting) in the porous electrode two orders of parallel flow channels. All the parallel spaced channels of each order extend from a common orthogonal base channel formed along the respective inlet or outlet side of the chamber and terminate short of reaching the base channel of the other order. Each order defines a comb-shaped flow distributing channelwork the parallel fingers of which interleave with the finger channels of the other order.

Practically, one comb-shaped channelwork has its base or manifolding channel running along a side of the chamber communicating with the inlet duct of the electrolyte into the chamber, while the other specular comb-shaped channelwork has its parallel finger channels interleaved with the parallel finger channels of the first channelwork, and has its base or manifolding channel running along the opposite side of the chamber communicating with the outlet electrolyte duct.

The interleaved finger flow channels preferable run parallel to each other, each terminating short of the manifolding base channel of the other order of interleaved parallel finger channels. Therefore, each inlet or "source" flow channel is separated from the two adjacent outlet or "drain" flow channels by a strip of a certain width of the three-dimensional porous electrode material, separating the parallel channels that may be eventually cut in it.

The interleaved orders of inlet and outlet electrolyte flow channels evenly distribute the electrolyte with a reduced pressure drop uniformly throughout the electrode area of the flow chamber, providing flow distribution channels throughout the mass of the three-dimensional porous electrode.

The pressure drop may be pre-arranged within a certain margin, by knowing the specific pressure drop of the electrolyte through the three-dimensional porous electrode material at a given flow rate and by designing the two orders of interleaved "source" and "drain" flow channels with an appropriate distance of separation from one another.

Besides outstandingly reducing the pressure drop suffered by the electrolyte flowing through the respective flow chambers in series from one end to the opposite end of the battery, this arrangement of interleaved "source" and "drain" channels, suitably cut through the thickness of the three-dimensional porous electrode, is found to outstandingly enhance the electrochemical performance of the battery because of a far more evenly distributed current density over the entire cell area of the battery, and because of a more effective prevention of parasitic half-cell reactions at the electrodes, typically hydrogen and oxygen evolution by electrolysis of water (the solvent).

BRIEF DESCRIPTION OF THE DRAWINGS

The different features and related advantages of the novel electrochemical battery architecture will become even more evident through the following description of a practical embodiment and by referring to the attached drawings, wherein.

DESCRIPTION OF PREFERRED EMBODIMENTS

FIGS. 1, 2, 3, 4 and 5 illustrate a bipolar cell battery in which electrode structures made according to an embodiment of the invention are employed.

Figure 1:
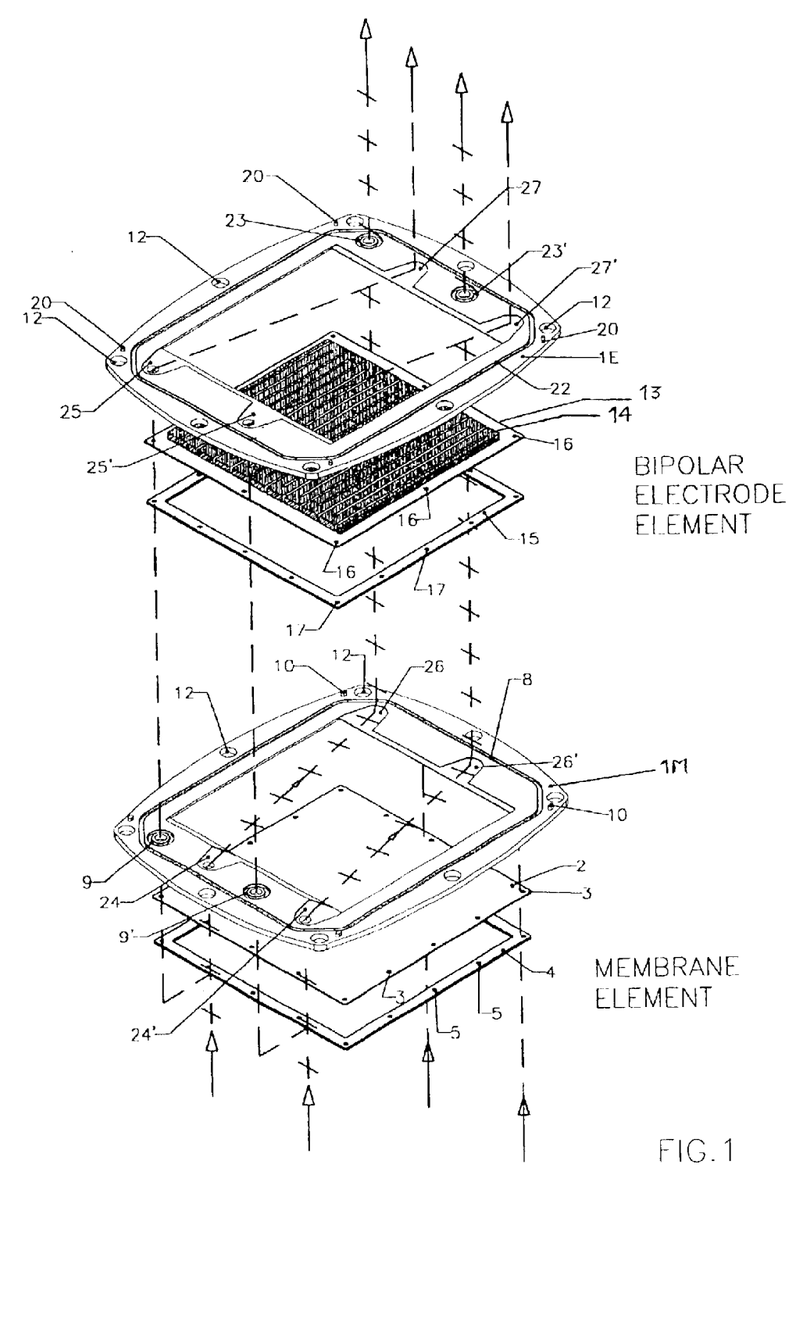
FIG. 1 is an exploded view of a membrane element and of a bipolar electrode element of the battery.

The exploded view of FIG. 1, representing the two types of the pre-assembled elements, namely a membrane element and a bipolar electrode plate element, provides an explicative overview of the peculiar architecture of the battery that has been used to prove the validity of this invention.

The frame portion 1M of membrane element and the frame portion 1E of a bipolar electrode element are under many aspects substantially similar. Both may be of a molded plastic material such as for example polypropylene, different molds being employed for the two types of frames 1E and 1M, for implementing suitably different keying pins and sockets.

The molded plastic frames 1M and 1E define a rectangular inner window, however, the outer perimeter of the frame is not rectangular but has a peculiarly curved shape, determined by the fact that each side of the frame has a convex outer edge, making the width of the cross section of the frame larger near the central portion of each side than near to corners. This particular shape of the frame optimizes weight versus structural strength, in consideration of the electrolyte pressure withstanding requisites. Indeed, the completed battery assembly is hydraulically tested to withstand a maximum electrolyte pressure of up to 5 atmospheres. The convex shape of the sides of the frame body has been found to best respond to the flexural strength requisite by reducing stress concentrations and achieving a most efficient weight/pressure resistance ratio.

In the exploded view of FIG. 1, the flow paths of the positive electrolyte and of the negative electrolyte through the respective positive electrode and negative electrode flow chambers are schematically traced by flow lines depicting the respective positive (+) and negative (−) signs.

The electrolyte flow paths are shown, according to a stacking orientation of the elements of the battery starting from a horizontally disposed bottom terminal element consisting of a positive end electrode.

In the figure, the lower element is a membrane element showing a rectangularly cut membrane 2 which may be either a cation exchange membrane such as sulphonated polyethylene membrane or a polystyrene sulphoric acid membrane or similar chemically resistant membrane or an anion exchange membrane.

The membrane 2, cut to size, has also a number of holes 3 punched along its perimetral portion at pre-determined positions. Similarly, a fixing counterflange 4, generally of the same material of the frame piece 1M, has holes at pre-ordered positions, geometrically coinciding with the positions of the holes 3 of the membrane 2.

Figure 2:
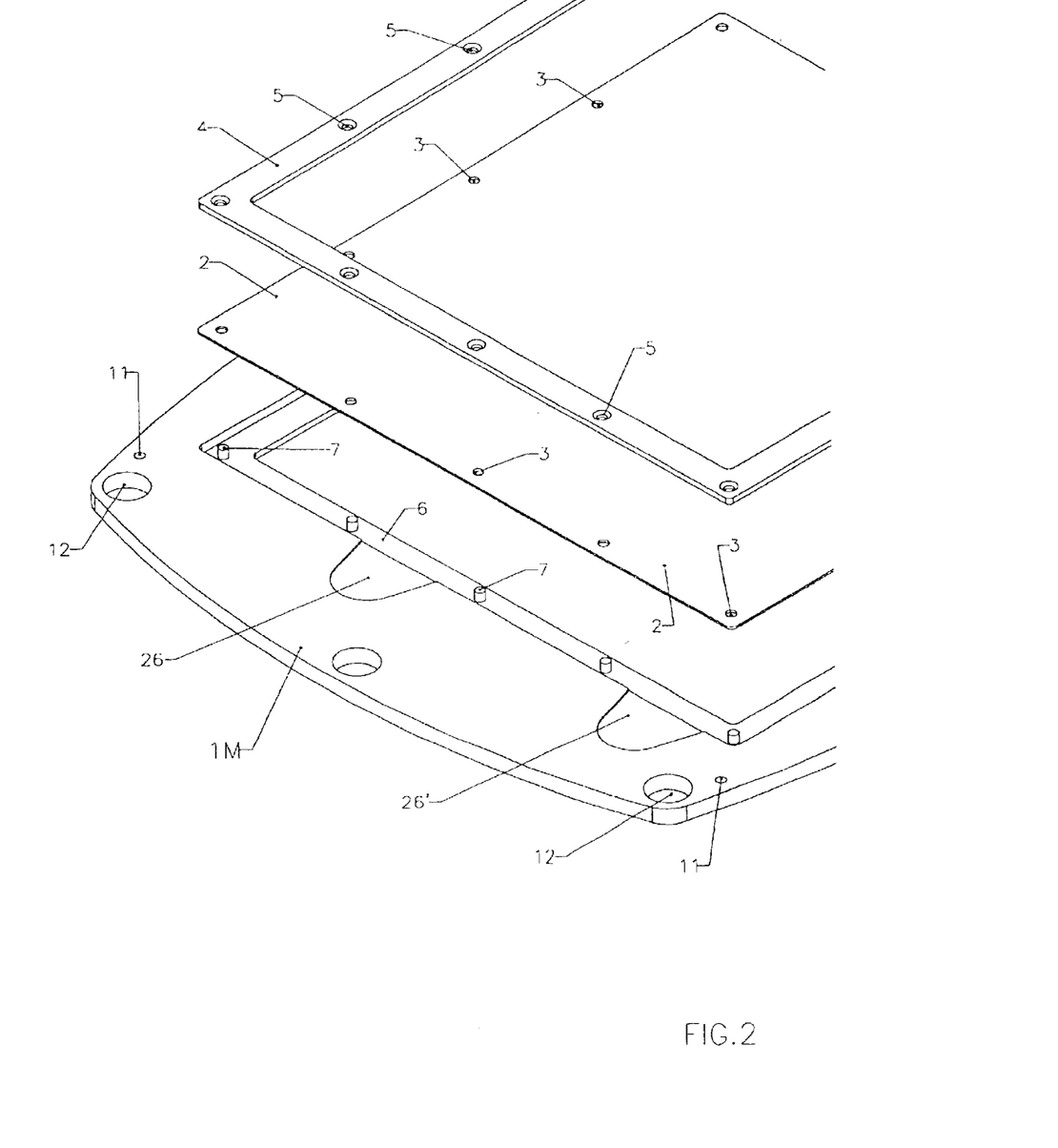
FIG. 2 is a fragmentary detail view of an upturned membrane element detailing the way the membrane may be fitted into a rectangular window of the frame.

By looking at FIG. 2, a detail enlarged view of the membrane element of FIG. 1, overturned by 180°, it is shown how the membrane 2 and the fixing counterflange 4 are accommodated over the recessed inner flange portion 6 of the frame 1M, the coordinated holes 3 and 5 of the membrane and of the retaining counterflange 4 respectively fitting on the array of molded retention pins 7 present on the face of the flange portion 6.

Spacer rubber gaskets may be disposed on the flange portion 6 before installing the membrane 2 and a second rubber gasket may be interposed between the membrane 2 and the fixing counterflange 4 to adjust to the required depth of the respective flow chambers on the opposite sides of the membrane 2 and/or to prevent leakages of the negative electrolyte into the positive electrolyte or visa versa by possible pressure differences in the two flow chambers on the opposite sides of the separating membrane 2.

Alternatively, a suitable sealant such as for example a silicone gel sealant may be used in pre-assembling the element to ensure a leakproof assembly.

By appropriate implements, the retaining counterflange 4 is eventually pressed over the membrane and the ends of the retention pins 7 protruding out of the holes 5 of the counterflange 4 are heat-riveted by the use of a heated tool, causing the "molding" of the molten tip of the pins 7 into the swaged holes 5 of the fixing flange 4.

Upon "riveting" the retention pins 7, the element is completely pre-assembled and may be stacked over a last-mounted bipolar electrode element in an overturned condition, without any risk for the pre-installed membrane to fall off.

Moreover, the upper face of the molded frame piece 1M of the membrane element may readily receive, if not already installed, a perimetral seal O-ring gasket 8 and the two negative (or positive) electrolyte ducts O-rings, 9 and 9'.

The upper face of the frame piece 1M of the membrane element has at least two, preferably four, keying pins 10, which, in the example, have an oblong cross section, while on the lower face, partially visible in the detail view of FIG. 2, two or preferably four pin sockets 11 are present, which in the example shown, have a circular cross section.

In the example shown in the figures, the tie rods that complete the battery assembly pass through the holes 12, formed ordered in the perimetral portion of all the frames and of the two end elements, external to the perimetral seal O-ring gasket 8.

The upper group of the exploded view of FIG. 1, depicts a bipolar electrode element.

According to the sample embodiment of this invention, the bipolar plate electrode is an electrically conductive composite that includes a conductive plate 13, which may be a glassy carbon plate with a thickness in the order of 1 to 3 or more millimeters. The glassy carbon plate may even include a metal core, for example an expanded metal screen or a wire net, for enhancing conductivity of the current collecting bipolar plate. Over the opposite faces of the electrode plate a carbon felt electrode structure 14 of a thickness (depth) that may generally be comprised between 1 and 5 or more millimeters is either bonded or even compressed in abutment thereon in order to ensure a good electrical contact between the carbon felt and the current collecting electrode plate.

The felt electrodes 14 are bonded in electrical continuity to the current collector plate 13 and have a relatively open structure such to be readily permeated by the electrolyte flown through the electrode chamber.

In this sample embodiment, the electrode composite, 13–14, is mounted in a respective frame piece 1E of a molded thermoplastic, typically of the same type with which are produced the frame pieces 1E of the membrane elements.

The pre-assembling of the electrode element is totally similar to the pre-assembling of a membrane element.

A different disposition of the coordinated plurality of holes 16 in the perimetral portion of the electrically conductive carbon plate septum 13 and of the holes 17 in the retention counterflange 15, and of course also of the retention pins 18 (FIG. 3) on the recessed inner flange portion 19 of the frame 1E, will prevent any possibility of error in pre-assembling the two types of stackable elements.

Figure 3:
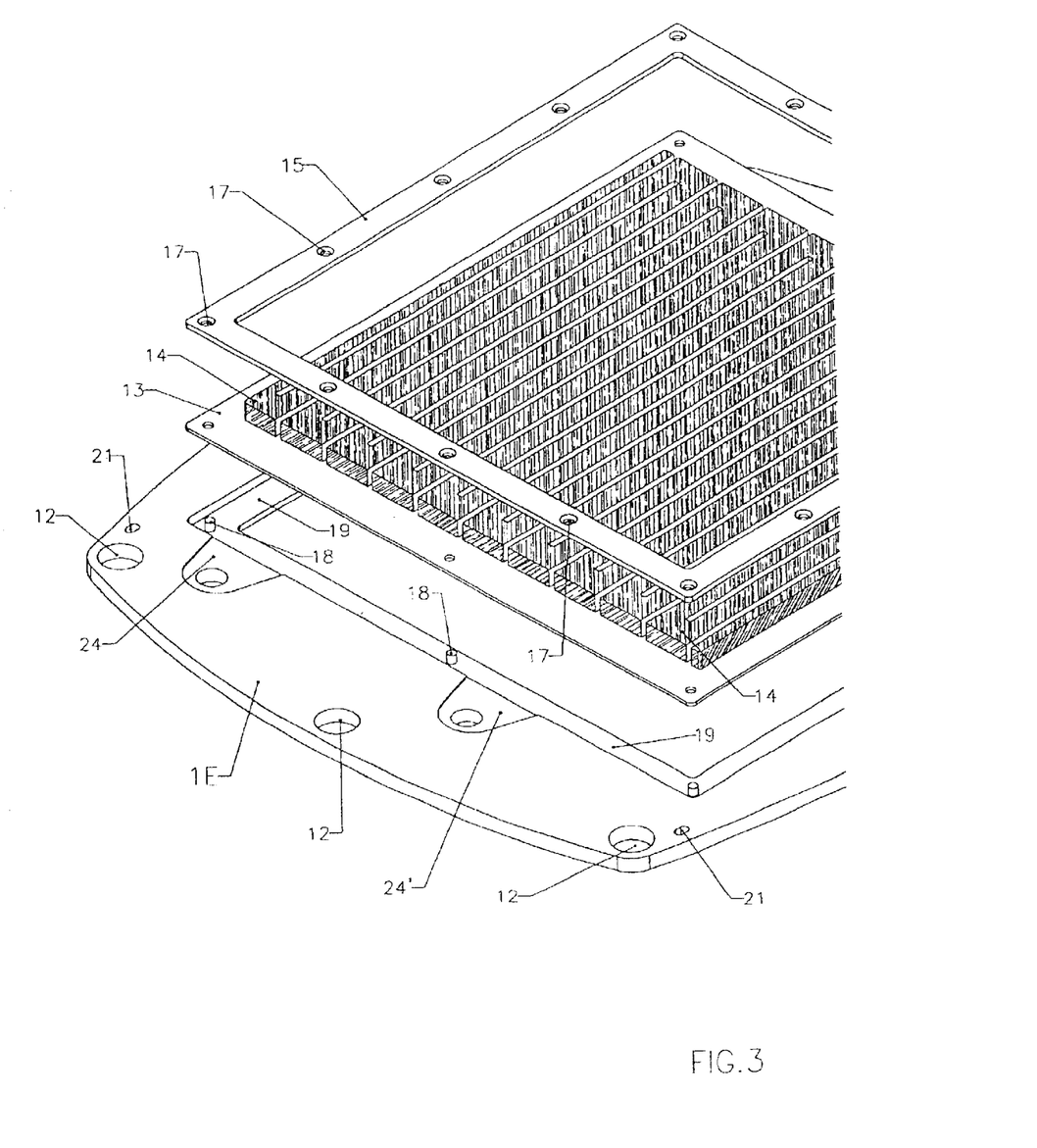
FIG. 3 is a fragmentary detail view of an upturned bipolar electrode element detailing the way an electrode may be fitted into the rectangular window of the frame.

FIG. 3 is an enlarged detail view of the electrode element of FIG. 1, overturned by 180°.

Differently from the frame piece 1M of the membrane element, the frame piece 1E of the electrode element has, on the upper face keying pins 20 (FIG. 1) having a circular cross section of a diameter appropriate to fit into the circular sockets 11 present on the underside of the frame piece 1M of a membrane element. As visible in the upturned view of FIG. 3, on the upper side of the molded frame piece 1E of the electrode element (FIG. 1), there are sockets 21 with an oblong cross section suitable to accommodate the keying pins 10 present on the upper side of the molded frame piece 1M of the membrane element.

Similarly to the frame piece 1M of the membrane elements, also the frame piece 1E of the electrode element has on its upper face grooves for accommodating a perimetral sealing O-ring 22 and two positive (or negative) electrolyte ducts O-rings 23 and 23'.

According to one aspect of the claimed invention, the porous carbon mat electrodes 14 have two distinct orders or channelworks of parallel and mutually interleaved electrolyte distributing channels oriented along the same direction of the electrolyte flow through the respective electrolyte flow chamber, starting from the inlet recessed slots 24 and 24' and 25 and 25' for the positive and negative electrolytes, respectively, to the outlet recessed slots 26 and 26' and 27 and 27', functionally present on opposite sides of the chamber, according to the battery architecture of this embodiment.

Of course, though in the example two ducts and relative slots are shown, depending on the side of the cells, there may be only one duct and slot or any number of ducts and slots for a better distribution and/or for reducing hydraulic pressure drops.

As depicted in FIGS. 1, 3, 4 and 5, a first "comb-shaped" channelwork has the finger channels s1, s2, s3, ..., sn, extending parallel to each other from a base or manifolding channel S defined along the side of the electrolyte flow chamber through which the electrolyte enters the chamber through the inlet slots, connecting with the respective electrolyte ducts, and end short from reaching the corresponding manifolding or base channel D defined along the opposite side of the flow chamber where the electrolytes exits the chamber through the outlet slots communicating with the respective electrolyte ducts.

Similarly, the second comb-shaped channelwork has finger channels d1, d2, d3, ... dn, extending parallel to each other from their base or manifolding channel D and they are interleaved with the finger channels s1, s2, s3, ..., of the first comb-shaped channelwork. The finger channels d1, d2, d3, ... of the second comb-shaped channelwork, terminate short of reaching of the base or manifolding channel S of the first channelwork.

The two interleaved orders of channels, s1, s2, s3, ..., and d1, d2, d3, ..., constitute an electrolyte distributing (source) channelwork and an electrolyte draining (drain) channel work.

Figure 4:
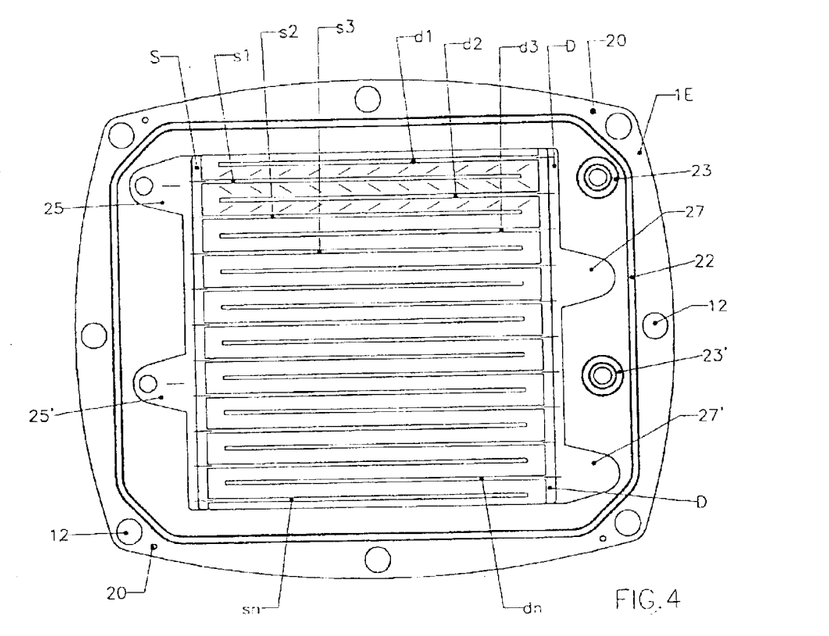
FIG. 4 is a plan view of an electrode element using electrode structures in the form of a carbon felt or fabric, according to a preferred embodiment of the invention.

As may be observed in the plan view of FIG. 4 and in FIGS. 1 and 3, the respective base or manifolding channels S and D for the incoming electrolyte and for the electrolyte exiting the flow chamber, respectively, are defined by having the felt electrode 14 ending at a certain distance from the side wall of the flow chamber so that the electrolyte entering the flow chamber through the inlet slots 24 and 24' (FIG. 3) or 25 and 25' (FIGS. 1 and 4) is able to distribute itself in this base or manifolding inlet channel S and from there to evenly distribute itself along the source finger channels s1, s2, s3, ....

The drain finger channels d1, d2, d3, ..., interleaved with the source finger channels, provide as many drain channels for the electrolyte directed to the exit slots 27 and 27' (FIG. 4).

The electrolyte is in this way evenly distributed throughout the mass of porous carbon fiber felt electrode 14 with a resulting low pressure drop.

As schematically indicated by the idealized flow arrows in FIG. 4, the electrolyte is practically subjected to flow laterally through a limited segment of carbon felt, effectively refreshing the electrolyte throughout the active electrode surface, on account of the fact that the cooperating interleaved source and drain channelworks provide for a flow path with a negligible pressure drop across the electrolyte flow chamber.

It has been found that with such a channelwork electrode configuration, the carbon felt electrode may occupy the entire depth of the electrolyte flow chamber of the cell, allowing for the membrane separator to abut directly against the surface of the channeled carbon felt electrode, minimizing ohmic drop in the electrolyte.

The two channelworks may be defined in the carbon felt electrode by cutting it after having been bonded to the bipolar electrode plate 13 or before. Indeed, a carbon felt may be pre-defined by cutting it with a die punch and adhered to a backing sheet to facilitate its handling throughout the bonding process. The backing sheet may ultimately be peeled off the surface of the bonded electrode or removed in any other suitable manner.

Figure 5:
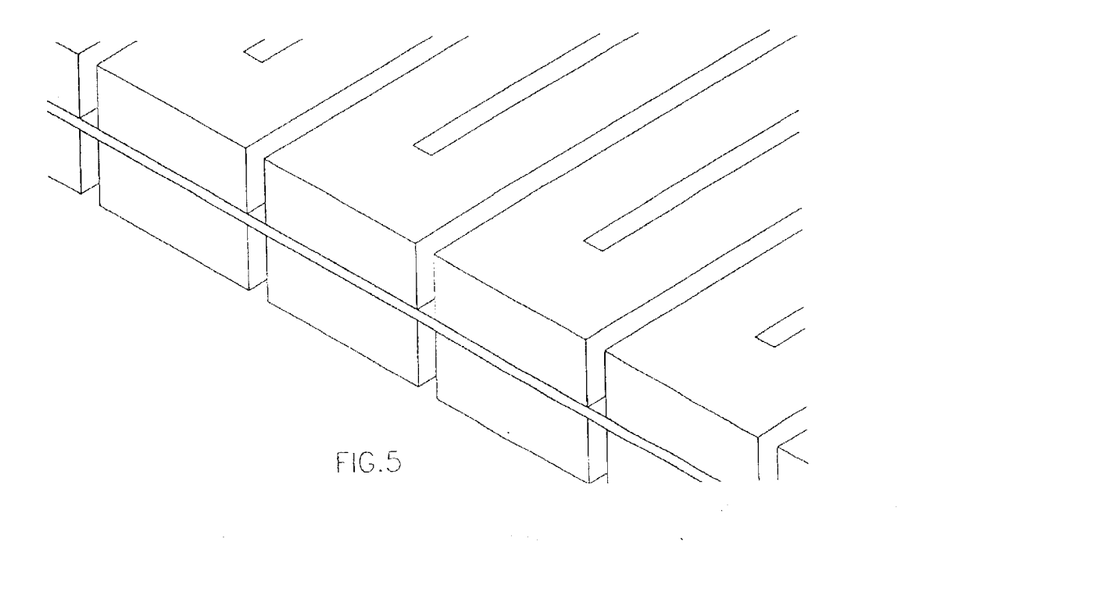
FIG. 5 is a fragmentary delay cross section of the bipolar plate electrode of FIGS. 1 and 3.

FIG. 5 is an enlarged detailed view of the peculiar structure of the composite electrode embodying the principles of this invention.

Figure 6:
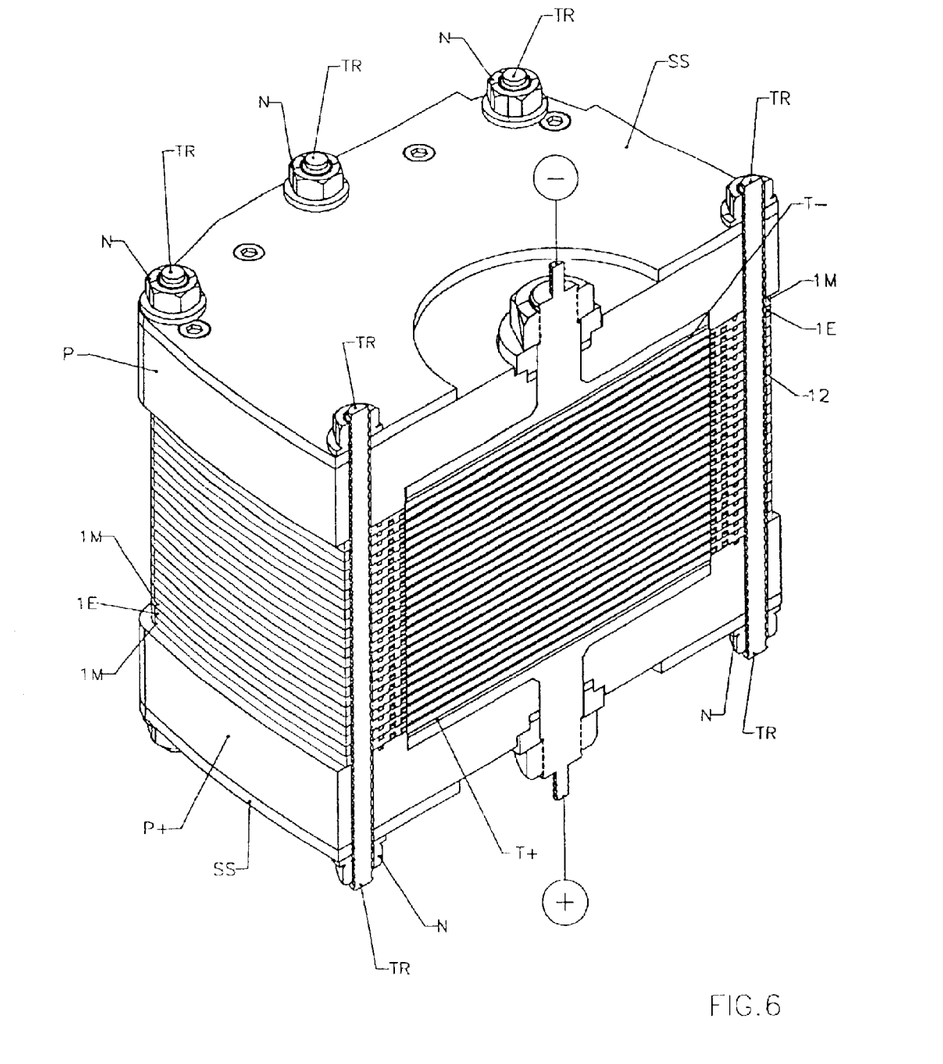
FIG. 6 is a cross sectional three-dimensional view of a completely assembled battery stack.

FIG. 6 is a cross sectional three-dimensional view of an assembled battery stack of the type described above.

According to this sample embodiment, the bottom end electrode, that in the example shown is constituted by a positive carbon electrode, T+ and the upper terminal electrode T− are set in sturdy end plates of a molded plastic P+ and P−, respectively, which are reinforced by a stress plate of stainless steel SS, onto which act the compression nuts N upon tensioning the tie rods TR.

The use of plastic end plates P+ and P− facilitate the constitution of a perfectly sealed and corrosion proof terminal for electrical connection of the battery in the external circuit.

The evenness of distribution of the pumped electrolyte solutions through the porous electrode structure over the whole cell area effectively contrasts uncontrolled creation of preferential flow paths that would have the effect of restricting the truly available cell area. Available cell area is restricted by creating relatively depleted regions (missing an adequate electrolyte refreshing) whereat undesired and potentially highly deleterious parasitic hydrogen or oxygen evolution may take place at intolerable rates.

According to one aspect of the invention, the three-dimensional fluid permeable electrode that may be referred to as a patterned or channelled porous mat electrode, may be of any open pore conductive material chemically resistant to the electrolytic solution to be flown through it and having a relatively high hydrogen over potential when used in a negative electrolyte flow compartment or a relatively high oxygen over potential when used in a positive electrolyte flow chamber, in order to prevent or minimize parasitic half cell reactions of hydrogen and oxygen evolution, respectively. These parasitic electrodic reactions may occur because of depletion phenomenon at the electrode surfaces. Sudden increases of the electric load, overcharge and overdischarge conditions of the electrolyte solutions containing the redox (ion) couples are critical conditions for the occurrence of parasitic reactions.

For this purpose, the open pore conductive material that forms the porous mat electrode may be eventually coated with a film of electrodically active substance provided by the relatively high hydrogen evolution overvoltage, and/or by a relatively high oxygen evolution overvoltage.

The porous mat electrode may be simply contacting the conductive current collector or more preferably it may be permanently bonded in electrical continuity thereto either by way of a conductive bonding material or by partially embedding the mat electrode material over the surface on the electrically conductive current collector. This may be a practicable solution when using a conductive thermoplastic current collector. In these cases, the porous mat electrode may be fastened onto the surface of the thermoplastic current collector by application of pressure and heat in a mold, according to a common technique.

When the electrically conductive current collector is of a material that cannot be plastically reflown for partially embedding the porous mat electrode, such as when using a glassy carbon plate, a metal plate, an expanded metal or a wire net, a permanent bond may be established by converting, in situ, a carbonizable precursor compound disposed on the surfaces to be bonded together into a glassy carbon that permanently "solder" together the porous mat to the current collector, in electrical continuity.

Alternatively, an appropriate conductive adhesive based on a thermosetting resin or a thermoplastic resin loaded with particles of conductive material, typically graphite, carbon, gold, silver, platinum, palladium and alloys or mixtures thereof, capable resisting chemical and electrochemical attack by the electrolyte may be used for bonding the porous mate electrode to the current collector, in electrical continuity.

Beside carbon fibers, the porous mat electrode, in the form of an electrically conductive felt, may be made of titanium wire or of stainless steel wire, coated with an electrodically active material such as carbon, titanium nitride, or tungsten.

Alternative materials that may be used include an open pore rigid sponges of glassy carbon or of titanium, preferably coated with an electrodically active substance such as carbon, titanium nitride, or tungsten.

Alternatively, instead of a sponge like structure, the porous mat electrode of the invention may be realized using an open pore mass of particles of electrically conductive material typically of glassy carbon, titanium, lead, stainless steel, bonded or cemented to each other to form a substantially rigid porous structure, to be eventually coated with an appropriate electrodically active substance by impregnating the porous structure with a precursor compound to be decomposed into the electrode active substance by heat treatment in an appropriate atmosphere, or in according to a chemical vapor deposition technique.

The foregoing description of the invention illustrates and describes various aspects of the invention. Additionally, the disclosure shows and describes only the preferred embodiments of the invention, but it is to be understood that the invention is capable of use in various other combinations, modifications, and environments, and is capable of changes or modifications within the scope of the inventive concept as expressed herein, commensurate with the above teachings, and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

What is claimed as new and desired to be protected by Letters Patent of the United States is:

1. An electrode suitable for use in an electrochemical reactor, the electrode comprising:
   a porous mat permeable to an electrolyte solution and including a source and a drain channelwork each having respective finger channels therein which are substantially parallel to each other,
   wherein the finger channels of the source channelwork are interleaved with the parallel finger channels of the drain channelwork;
   wherein the source channelwork has a manifolding channel running along an inlet side of a chamber where the electrolyte solution is fed into the chamber,
   wherein the drain channelwork has a manifolding channel opposing the manifolding channel of the source channelwork and running along an outlet side of the chamber from where the electrolyte solution exits the chamber,
   wherein all finger channels of each of the interleaved source and drain channelworks extend from the respective manifolding channel and terminate short of reaching the manifolding channel of the other channelwork.

2. The electrode of claim 1, wherein the porous mat comprises a material selected from the group consisting of carbon fibers, titanium wire and stainless steel wire.

3. The electrode of claim 2, wherein the porous mat comprises an electrically conductive felt material.

4. The electrode of claim 1, wherein the porous mat comprises an open pore sponge of an electrically conductive material selected from the group consisting of glassy carbon and titanium.

5. The electrode of claim 1, wherein the porous mat comprises an open pore mass of particles of two or more electrically conductive materials selected from the group consisting of glassy carbon, titanium, lead and stainless steel electrically coupled to each other.

6. The electrode of claim 1, wherein the porous mat has a coating of material thereon selected from the group consisting of carbon, titanium nitride, and tungsten.

7. The electrode of claim 1, wherein the porous mat has a coating of an electrodically active material.

8. The electrode of claim 1, wherein an electrical contact of the porous mat with an electrically conductive current collector comprises a bond of glassy carbon.

9. The electrode of claim 1, wherein an electrical contact of the porous mat with an electrically conductive current collector comprises:
   a conductive resin selected from the group consisting of thermosetting resin and thermoplastic resin; and
   particles including one or more conductive materials selected from the group consisting of graphite, carbon, gold, silver, platinum, and palladium.

10. The electrode of claim 1, wherein an electrical contact of the porous mat with an electrically conductive current collector is established by at least partially embedding the porous mat over a surface of the electrically conductive current collector.

11. The electrode of claim 1, wherein the interleaved source and drain channelworks are essentially comb-shaped.

12. An electrochemical reactor suitable for conducting half-cell reduction and oxidation reactions in respective positive and negative liquid electrolytes, the electrochemical reactor comprising the electrode of claim 1.

13. The electrochemical reactor of claim 12, further comprising respective flow chambers arranged on opposite sides of an ion exchange membrane cell separator,
   wherein the respective positive and negative liquid electrolytes are in flow-through contact with electrodes disposed in the respective flow chambers.

14. An electrode arrangement suitable for use in an electrochemical reactor, the electrode arrangement comprising the electrode of claim 1 coupled to an electrically conductive current collector.

15. A method of forming the electrode arrangement of claim 14, comprising:
   providing a carbonizable precursor material disposed on surfaces to be bonded together; and
   converting, in-situ, the carbonizable precursor material into a bond of glassy carbon.

16. A multicell assembly comprising the electrode of claim 1.

* * * * *